(12) United States Patent
Reed

(10) Patent No.: US 7,480,773 B1
(45) Date of Patent: Jan. 20, 2009

(54) VIRTUAL MACHINE USE AND OPTIMIZATION OF HARDWARE CONFIGURATIONS

(75) Inventor: Eugene R. Reed, Warrensburg, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 333 days.

(21) Appl. No.: 11/119,567

(22) Filed: May 2, 2005

(51) Int. Cl.
*G06F 15/16* (2006.01)
(52) U.S. Cl. ...................... 711/153; 718/104
(58) Field of Classification Search ............... 718/104, 718/1; 711/153
See application file for complete search history.

(56) References Cited

U.S. PATENT DOCUMENTS

| | | | |
|---|---|---|---|
| 6,356,979 B1 * | 3/2002 | Sicola et al. ............... | 711/114 |
| 6,496,847 B1 * | 12/2002 | Bugnion et al. ............ | 718/1 |
| 7,185,223 B2 * | 2/2007 | Hsu et al. ................. | 714/6 |
| 7,203,944 B1 * | 4/2007 | van Rietschote et al. .... | 718/104 |
| 7,246,174 B2 * | 7/2007 | Sciandra et al. ........... | 709/244 |
| 7,356,679 B1 * | 4/2008 | Le et al. .................. | 713/1 |
| 2003/0005068 A1 * | 1/2003 | Nickel et al. ............. | 709/208 |
| 2004/0078369 A1 * | 4/2004 | Rothstein et al. .......... | 707/7 |
| 2004/0172574 A1 * | 9/2004 | Wing et al. ............... | 714/4 |
| 2005/0108582 A1 * | 5/2005 | Fung ...................... | 713/300 |
| 2005/0229182 A1 * | 10/2005 | Grover et al. ............. | 718/105 |
| 2005/0240727 A1 * | 10/2005 | Shah et al. ............... | 711/114 |
| 2006/0090136 A1 * | 4/2006 | Miller et al. .............. | 715/734 |
| 2006/0143350 A1 * | 6/2006 | Miloushev et al. ........ | 710/242 |
| 2006/0171384 A1 * | 8/2006 | Graves .................... | 370/389 |
| 2006/0248142 A1 * | 11/2006 | Ishizaki et al. ........... | 709/203 |
| 2007/0106992 A1 * | 5/2007 | Kitamura ................. | 718/104 |

FOREIGN PATENT DOCUMENTS

GB  2418326 A  *  3/2006

OTHER PUBLICATIONS

Rob Bastiaansen. Rob's Guide to Using VMWare (Leusden, The Netherlands: Rob Bastiaansen, Jul. 2004), pp. 11, 18, 72, 129, 157, 161, 165, 175.*
Carl A. Waldspurger. "Memory Resource Management in VMware ESX Server," Proceedings of the 5th Symposium on Operating Systems Design and Implementation (Boston: Dec. 2002).*
VMware ESX Server User's Manual, version 1.5 (Palo Alto: VMware, 2002), pp. 20, 47, 212, 251, 252.*
Andrew Tanenbaum and Maarten Van Steen, Distributed Systems: Principles and Paradigms (Upper Saddle River, NJ: Prentice Hall, 2002), pp. 361, 371.*
Hu Yoshida, LUN Security Considerations for Storage Area Networks, Santa Clara, CA: Hitachi Data Systems, 1999), pp. 1-2.*
VMware, Inc., Subsidiary of EMC Corporation, "VMware", http://en.wikipedia.org/wiki/VMware, Apr. 15, 2005, 3 pgs.

* cited by examiner

*Primary Examiner*—Pierre-Michel Bataille
*Assistant Examiner*—Hal Schnee

(57) ABSTRACT

A method of building a computer system is provided. The method comprises determining an average memory storage per virtual machine, determining an average number of virtual machines per host computer, and determining an amount of memory storage per memory pool. The method also comprises determining a maximum number of host computers per memory pool based on the average memory storage per virtual machine, the average number of virtual machines per host computer, and the amount of memory storage per memory pool. The method also includes assembling the appropriate number of host computers and memory storage, organized around memory pools, to handle a specific number of virtual machines.

18 Claims, 4 Drawing Sheets

VIRTUAL MACHINE USE AND OPTIMIZATION OF HARDWARE CONFIGURATIONS

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer systems, and more particularly, but not by way of limitation, to a method for determining virtual machine use and optimization of hardware configurations.

BACKGROUND OF THE INVENTION

Computing resources may be provided by a variety of different host computers operating with different operating systems such as Microsoft Windows®, Linux, SunOS®, HP-UX®, and AIX®. Alternatively, computing resources may be provided by several powerful host computers each providing several virtual machines (VM). A VM may provide an execution environment for applications that isolates the applications from the underlying machine. The VM may provide an emulation of an operating system, such as Microsoft Windows®, Linux, SunOS®, HP-UX®, AIX® and others, that the applications may execute on.

Digital storage or memory may be organized into addressable segments referenced by a logical unit number (LUN). In some cases, the portion of memory may be referred to as a LUN. Some virtual machines may be able to address a limited number of LUNs.

Host computers may use multiple central processing units (CPUs) to distribute the work load of the host computer. Increasing the number of CPUs in a host computer generally increases the processing power of the host computer, but efficiency may drop off with increased numbers of CPUs. For example, while an eight CPU host computer may operate at high CPU utilization rates, a sixteen CPU host computer may operate at diminished CPU utilization rates because of competition among CPUs to access a shared memory bus. In general, the architecture of internal memory busses and external connectivity and the character of the applications and/or virtual machines that run on a multi-CPU host computer effect the efficiency of use of the multiple CPUs.

SUMMARY OF THE INVENTION

According to one embodiment, a method of building a computer system is provided. The method comprises determining an average memory storage per virtual machine, determining an average number of virtual machines per host computer, and determining an amount of memory storage per memory pool. The method also comprises determining a maximum number of host computers per memory pool based on the average memory storage per virtual machine, the average number of virtual machines per host computer, and the amount of memory storage per memory pool. The method also includes assembling the appropriate number of host computers and memory storage, organized around memory pools, to handle a specific number of virtual machines.

According to another embodiment, a method of porting servers to a virtual machine pool is provided. The method includes determining an average memory allocation per server, including an operating system memory allocation and an application memory allocation. The method also includes allocating a plurality of servers to a plurality of virtual machines, determining a host computer central processing unit count, and determining an average number of virtual machines per host computer based at least in part on the host computer central processing unit count. The method includes determining an amount of memory storage per memory pool, and determining a maximum number of host computers per memory pool. The method also includes determining a number of virtual machines to support the servers, and porting the servers to the virtual machines.

In one embodiment, a computer system is provided that includes one or more memory pools and a plurality of host computers organized around the memory pools. The number of host computers is determined based at least in part on a determination of an average of memory storage consumed per server, a determination of an average number of virtual machines per host computer, and an amount of memory storage per the memory pool.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

A method for configuring and scaling a large computing system comprising host computers sharing access to a memory pool is disclosed. The host computers support virtual machines (VMs) that are preferably relocatable among the host computers. The virtual machines are able to address only some maximum number of LUNs, and thus, to remain relocatable among the host computers sharing the memory pool, the memory pool size may be constrained to the maximum number of LUNs that a host computer can address. The method includes determining a maximum number of host computers per memory pool based on first determining an average memory storage amount per virtual machine, determining an average number of virtual machines per host computer, and determining an amount of memory storage per memory pool. The method also includes assembling the appropriate number of host computers and memory storage, organized around memory pools, to handle a known number of virtual machines. The known number of virtual machines may be determined, for example, by cataloging the number of servers to be migrated to the virtual machine environment.

Figure 1:
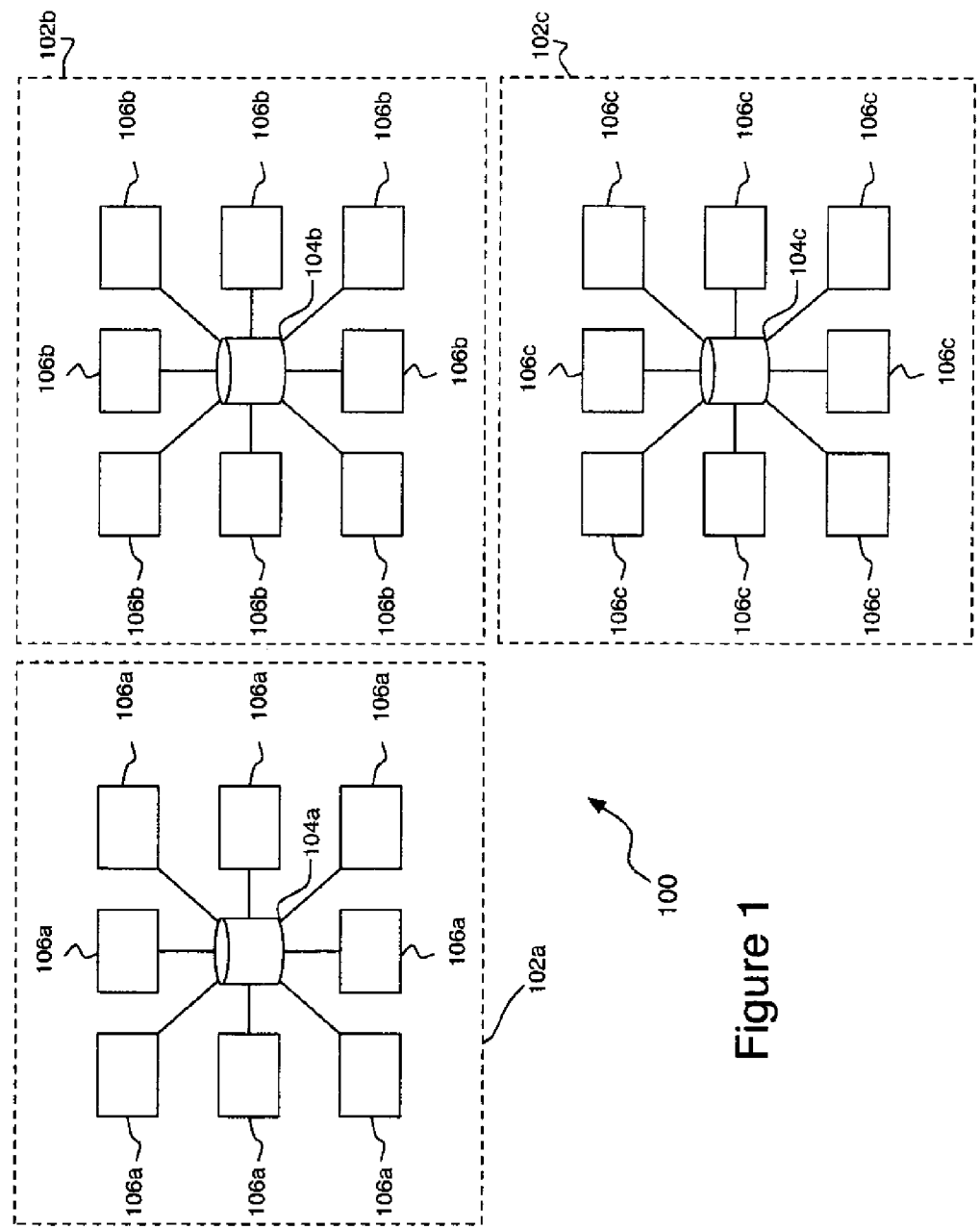
FIG. 1 is a block diagram of an exemplary computing system according to an embodiment of the present disclosure.

Turning now to FIG. 1, a system 100 for data processing or computing is depicted. The system 100 comprises three computing groups 102—a first computing group 102a, a second computing group 102b, and a third computing group 102c. Each computing group 102 comprises a memory pool 104 and a plurality of host computers 106. The memory pool 104 may comprise a plurality of disk drives or other mass storage devices. The host computers 106 share the memory pool 104, and the size of the memory pool is determined such as to provide sufficient memory storage to promote efficient processing in each of the host computers 106. In an exemplary embodiment, the memory pool comprises about 9.6 terrabytes of memory divided into about 96 LUNs. The number of host computers 106 associated with the memory pool 104 may be determined based on a fail-over configuration wherein one host computer 106 fails and the remaining host computers 106 associated with the memory pool 104 absorb the processing load of the failed host computer 106. In an embodiment, each of the computing groups 102 may comprise eight host computers 106. In other embodiments, different numbers of host computers 106 may be associated with each memory pool 104 and a different quantity of memory may comprise the memory pool 104. Additionally, other numbers of computing groups may be installed. The system 100 is suitable for porting servers and server applications from a plurality of disparate computers to a plurality of virtual machines running on the system 100.

Figure 2:
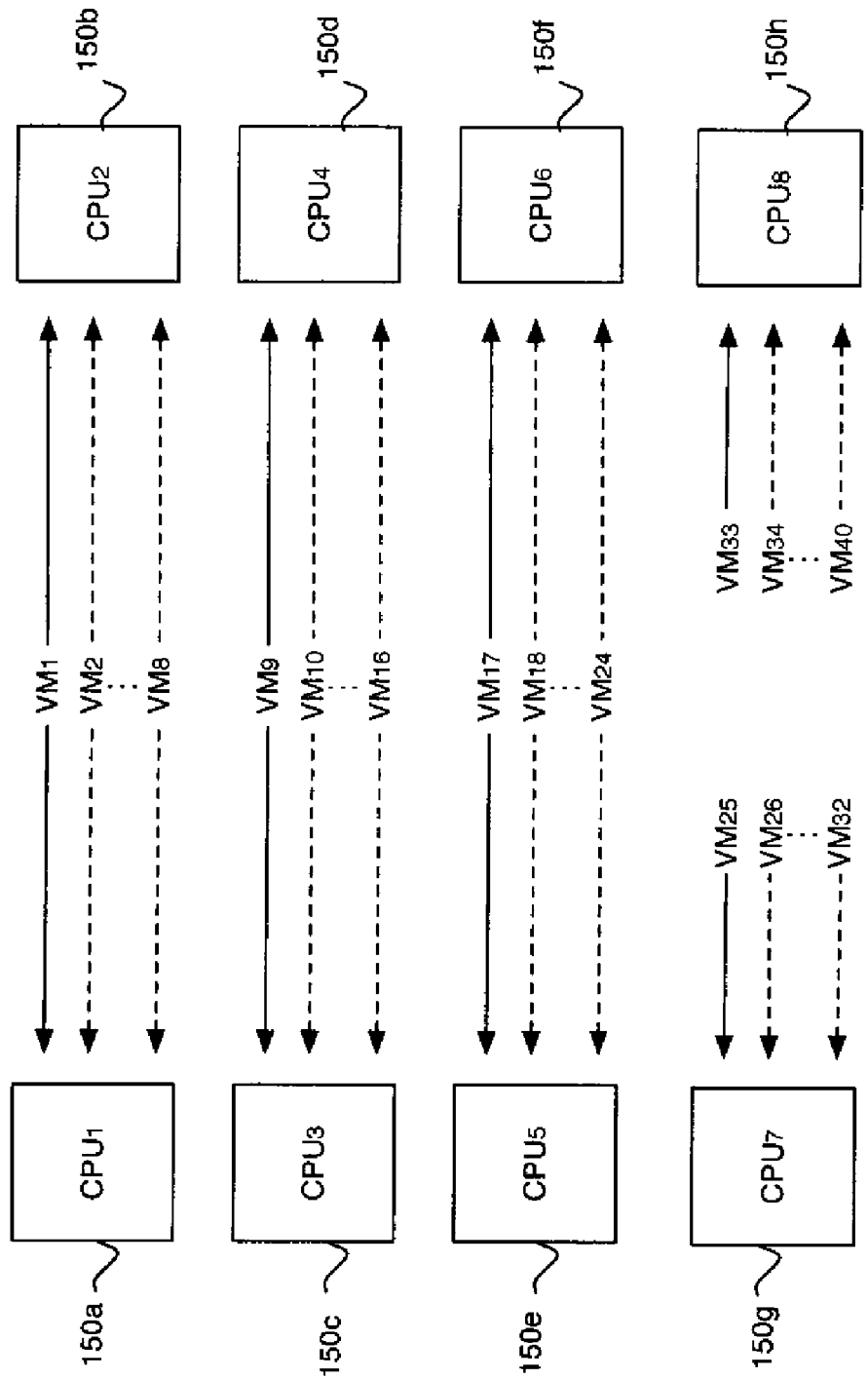
FIG. 2 is a block diagram of an exemplary distribution of virtual machines to central processing units for an eight central processing unit host computer according to an embodiment of the present disclosure.

Turning now to FIG. 2, a plurality of CPUs 150 within one host computer, for example host computer 106, are depicted as associated with virtual machines with solid lines at one instant in time. At a later point in time, the association of virtual machines to particular CPUs 150 may be changed. Additionally, while at any instant in time one CPU 150 is executing only one instruction from one virtual machine, multiple virtual machines are shown associated with each of the CPUs 150 using dotted lines to depict graphically a possible allocation of virtual machines to the CPUs 150 by a scheduler over an interval of time. While eight central processing units—a $CPU_1$ 150a, $CPU_2$ 150b, $CPU_3$ 150c, $CPU_4$ 150d, $CPU_5$ 150e, $CPU_6$ 150f, $CPU_7$ 150g, and $CPU_8$ 150h—are depicted in FIG. 2, in other embodiments a different number of CPUs 150, for example sixteen CPUs 150, may be employed. The number of CPUs 150 installed in one host computer may be referred to as the central processing unit count of the host computer or the CPU count of the host computer. A scheduler may be operable within the host computer 106 to schedule virtual machines to run in any of the CPUs 150. For example, the scheduler, having scheduled a virtual machine $VM_1$ to run in $CPU_1$ 150a and $CPU_2$ 150b at the instant depicted in FIG. 2, may at a later moment in time schedule the virtual machine $VM_1$ to run in $CPU_5$ 150e and $CPU_7$ 150g. As is well known to one skilled in the art, schedulers grant use of the CPU 150 to a succession of single processes or computer programs, for example virtual machines, for short time slices or durations.

A plurality of virtual machines are shown executing in various of the CPUs 150. A virtual machine may provide an execution environment for applications that isolate the applications from the underlying machine. In an embodiment, commercial off-the-shelf-software (COTS) provided by an independent software vendor (ISV) may be employed to provide the environment for running the virtual machines. In an embodiment, for example, VMware ESX® may be employed to provide a plurality of virtual machines for each of the several CPUs 150 of a host computer 106. VMware ESX® is software that runs on the host computer 106, interacting with the native hardware of the host computer 106. VMware ESX® provides an execution environment that may be segmented into distinct virtual machines where a native operating system, such as Microsoft Windows® or Linux, may be installed.

Multiple virtual machines may run in a single CPU 150. In an exemplary embodiment, as many as eight virtual machines may run in a single CPU 150. Each of $VM_1$ through $VM_8$ execute concurrently in both $CPU_1$ 150a and $CPU_2$ 150b. Each of $VM_9$ through $VM_{16}$ execute concurrently in both $CPU_3$ 150c and $CPU_4$ 150d. Each of $VM_{17}$ through $VM_{24}$ execute concurrently in both $CPU_5$ 150e and $CPU_6$ 150f. $VM_{25}$ through $VM_{32}$ execute in $CPU_7$ 150g. $VM_{33}$ through $VM_{40}$ execute in $CPU_8$ 150h. A virtual machine may execute concurrently in two CPUs because it has a heavy processing load or is subject to tight time constraints. While the virtual machines $VM_1$ through $VM_{40}$ illustrated in FIG. 2 are shown associated with one or two of the CPUs 150, the virtual machines may be executed on other CPUs. For example, the virtual machines may execute on a first CPU 150 at one time and be moved later to execute on a second CPU 150 at a later time. Additionally, any virtual machine may be associated with any one or more CPUs 150, so long as the maximum loading limit of the CPUs 150 is adhered to.

Some virtual machines may preferably execute concurrently in more than two CPUs, for example in four CPUs or in eight CPUs. A virtual machine that executes in only one CPU may be referred to as a "one-CPU virtual machine," a virtual machine that executes concurrently in two CPUs may be referred to as a "two-CPU virtual machine," a virtual machine that executes concurrently in four CPUs may be referred to as a "four-CPU virtual machine," and a virtual machine that executes concurrently in eight CPUs may be referred to as an "eight-CPU virtual machine."

In some circumstances, other CPU installations in the host computer 106 may be preferable. The memory bus architecture and the external connectivity of the host computer 106 may be considered in connection with the kind of virtual machine loads to select a CPU count for the host computer 106. For example, in a system 100 where the virtual machines concurrently run in, at most, two CPUs, an eight CPU host computer 106 may be preferable, while where the virtual machines concurrently run in, at most, four CPUs, a sixteen CPU host computer 106 may be preferable. With larger virtual machines, for example four-CPU virtual machines, it may desirable to use a larger physical host computer 106, for example a host computer 106 having sixteen CPUs, to realize the greater processing power of a four-CPU virtual machine.

Figure 3:
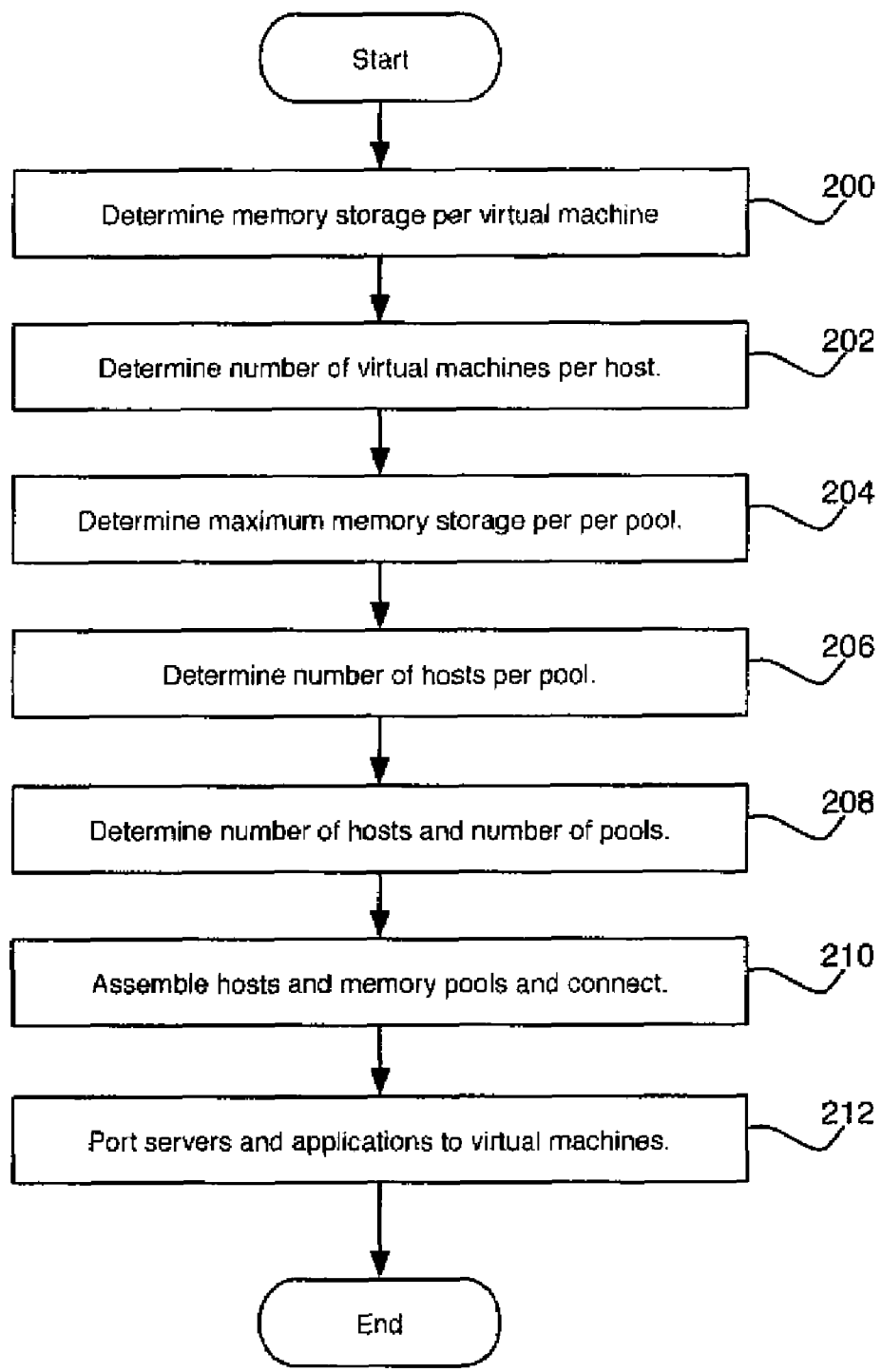
FIG. 3 is a flow diagram of a method of determining a computing system configuration according to an embodiment of the present disclosure.

Turning now to FIG. 3, a method for determining the number of host computers 106 and the number of memory pools 104 to configure to support a known number of virtual machines is depicted. This method may be employed, for example, when migrating from a plurality of disparate machines to a uniform host machine environment. The process begins in block 200 where an average amount of memory storage per virtual machine is determined. In practice, a virtual machine may promote functionality provided by an application, a server, or a server application that is being ported to the virtual machine environment. Each application, server, and/or server application can be expected to consume memory to contain the computer instructions or computer program that implements the functionality. In addition to this instruction memory, the application, server, and/or server application will run in the environment of an operating system, and memory storage may be allocated to the computer instructions associated with the operating system.

The average amount of memory storage, represented by $M_{avg}$, can be calculated by summing the application memory and operating system memory across the total number of applications and servers to be supported in the virtual machines and dividing through the total by the number of applications and servers. In an exemplary embodiment, it was found that the operating system typically consumed an average of about four gigabytes of storage and the application/server instructions consumed an average of about twenty-one gigabytes of storage for a total average memory storage of twenty-five gigabytes of memory storage per virtual machine. In other embodiments, other average memory storage needs may be determined.

The process flows to block 202 where an average or nominal number of virtual machines per host computer, represented by $VM_{avg}$, is determined. The determination of the nominal number of virtual machines per host computer is based in part on the number of CPUs 150 installed in the host computers 106 and the number of virtual machines which are able to share a CPU 150. In an embodiment, the nominal number of virtual machines per host was found to be forty virtual machines per host computer, based on a host computer 106 having eight CPUs 150, each CPU 150 able to support eight virtual machines and based on an installation of twenty-four two-CPU virtual machines and sixteen one-CPU virtual machines. This exemplary installation of virtual machines is depicted in FIG. 2.

In another embodiment, for example where the host computer 106 has sixteen CPUs 150, several four-CPU virtual machines may be employed. Depending upon the implementation, the host computer 106 with sixteen CPUs 150 may support up to one hundred and twenty-eight one-CPU virtual machines, more or less. The same host computer 106 with sixteen CPUs 150 may support sixty-four two-CPU virtual machines, thirty-two four-CPU virtual machines, or sixteen eight-CPU virtual machines. In an exemplary embodiment employing a host computer having sixteen CPUs 150, eight four-CPU virtual machines, twenty-four two-CPU virtual machines, and forty-eight one-CPU virtual machines may be deployed on the host computer 106. In this exemplary embodiment, the virtual machine count would be eighty per host computer. Other combinations of eight-CPU virtual machines, four-CPU virtual machines, two-CPU virtual machines, and one-CPU virtual machines are contemplated by the present disclosure. While a typical or representative installation of virtual machines may be employed for determining the average or nominal number of virtual machines per host computer, this does not constrain the implementer to abide by this installation. For example, in an embodiment, twenty-two two-CPU virtual machines and fourteen one-CPU virtual machines may be installed on one host computer 106 having eight CPUs 150.

The process flows to block 204 where a maximum initial memory storage per memory pool 104 is determined. The limitation on the size of the memory pool 104, represented by $MP_{max}$, derives from the ability of virtual machines to address all of the memory of the memory pool 104 and hence remain relocatable within the computing group 102. In an exemplary embodiment, one host computer 106 is able to address a maximum of one hundred twenty-eight LUNs. Additionally, the efficiency of memory utilization of LUNs, for example the speed of access to the LUNs, may begin to drop for LUN sizes significantly above about one hundred gigabytes. Because memory needs may be expected to grow, the determination of the maximum memory storage per memory pool 104 is multiplied through by a coefficient of about 0.6 to 0.9. In this embodiment, the maximum initial memory storage per memory pool 104 may be determined as $$MP_{max} = (0.75)\{coefficient\} \times 128\{\text{maximum LUNs}\} \times 100 \text{ Gbytes}\{\text{LUN efficiency size}\} = 9{,}600 \text{ gigabytes} = 9.6 \text{ terrabytes} \quad (1)$$

Note that this determination of $MP_{max}$ allows for memory storage growth of thirty-three percent, relative to 9.6 terrabytes. Additionally, the 100 Gbyte limitation is not an absolute maximum, thereby providing additional memory expansion opportunities by storing more than 100 Gbyte per LUN. From this discussion, it will be readily appreciated that $MP_{max}$ is not a maximum limit, but rather a design and analysis "maximum." While at present, LUNs operate most efficiently if their size does not significantly exceed about 100 gigabytes, this threshold is likely to change as technology advances, in which case the appropriate memory size threshold may be employed in this determination. Also, while LUN performance may begin to degrade for LUN sizes above 100 gigabytes it does not prohibit operating LUNs storing substantially greater than 100 gigabytes. For example, in another embodiment a LUN size of 200 gigabytes may be employed and used as the size of LUNs for purposes of this calculation.

The process proceeds to block 206 where the number of host computers 106 that may share a memory pool 104, is determined, based on the number of virtual machines per host computer, the amount of memory per virtual machine, and the maximum memory storage per memory pool. This value may be represented by H and may be calculated as:

$$H \leq \frac{MP_{max}}{M_{avg} \times VM_{max}} \quad (2)$$

In an embodiment, the host computers 106 associated with the memory pool 104 may provide a fail-over capability wherein when one host computer 106 fails, the remaining host computers 106 share the processing load that was distributed to the failed host computer 106. The host computers 106 preferably carry a normal average processing load represented by $L_n$. The host computers 106 are able to sustain a maximum average processing load represented by $L_m$. When one host computer 106 fails, the remaining host computers 106 share the load $L_n$ that was distributed to the failed host computer 106 divided by the number of the remaining host computers 106 which may be represented as H−1. The minimum number of host computers 106 needed to absorb the processing load of a failed host computer 106, subject to the constraint that each host computer 106 bears the load $L_n$ when no fail-over condition exists, may be calculated as:

$$H \geq \frac{L_n}{L_m - L_n} + 1 \qquad (3)$$

Combining equations (2) and (3) constrains the preferable number of host computers 106 associated with one memory pool 104 to the range determined as:

$$\frac{MP_{max}}{M_{avg} \times VM_{max}} \geq H \geq \frac{L_n}{L_m - L_n} + 1 \qquad (4)$$

where H is an integer. The system designer or system architect may adjust the values of the parameters used in equation (4) to analyze how sensitive a system design is to variation in the basic modeling assumptions. In an embodiment, the normal average processing load $L_n$ of the host computers 106 is about eighty percent CPU utilization and the maximum sustainable processing load $L_m$ of the host computers 106 is about 93 percent CPU utilization.

In an exemplary embodiment, the variables of equation (4) may have the following values:

$MP_{max}$=9.6 Terrabytes=9,600 Gbytes $M_{avg}$=25 Gbytes $VM_{max}$=40

$L_n$=0.8

$L_m$=0.92

Using these values, equation (4) reduces to the inequality:

9.6≧H≧7.667

Constraining H, the number of host computers 106, to be an integer value, in this exemplary embodiment the preferred number of host computers 106 per memory pool 104 is determined to be 8 or 9. In the computer systems art, even numbers of devices may be preferred, and hence in this exemplary embodiment, 8 host computers 106 are associated with each memory pool 104. Note that the selection of 8 rather than 9 host computers 106 permits increasing of the average amount of memory consumed per virtual machine, providing a somewhat higher memory storage expansion capacity.

The process proceeds to block 208 where the number of host computers 106 and the number of memory pools 104 to support a specified number of virtual machines is determined. In practice, the number of virtual machines needed to support servers and applications may be known and the numbers of host computers 106 and memory pools 104 are to be calculated. The number of memory pools 104 depends upon the number of host computers 106. The number of host computers 106 may be determined based on the number of virtual machines. The number of host computers 106 is an integer that is greater than or equal to the number of virtual machines to be run divided by the number of virtual machines per host computer.

The process proceeds to block 210 where the numbers of host computers 106 and memory pools 104 determined in block 208 are assembled and connected. This activity may involve budgeting equipment purchase and obtaining management approval for requisitions. This activity may involve facilities design and construction activities well known to those skilled in the art, for example determining and providing adequate environmental controls and uninterruptible power infrastructure.

The process proceeds to block 212 where the servers and applications are ported from the disparate computers to virtual machines running in the host computers 106. The process then ends.

Figure 4:
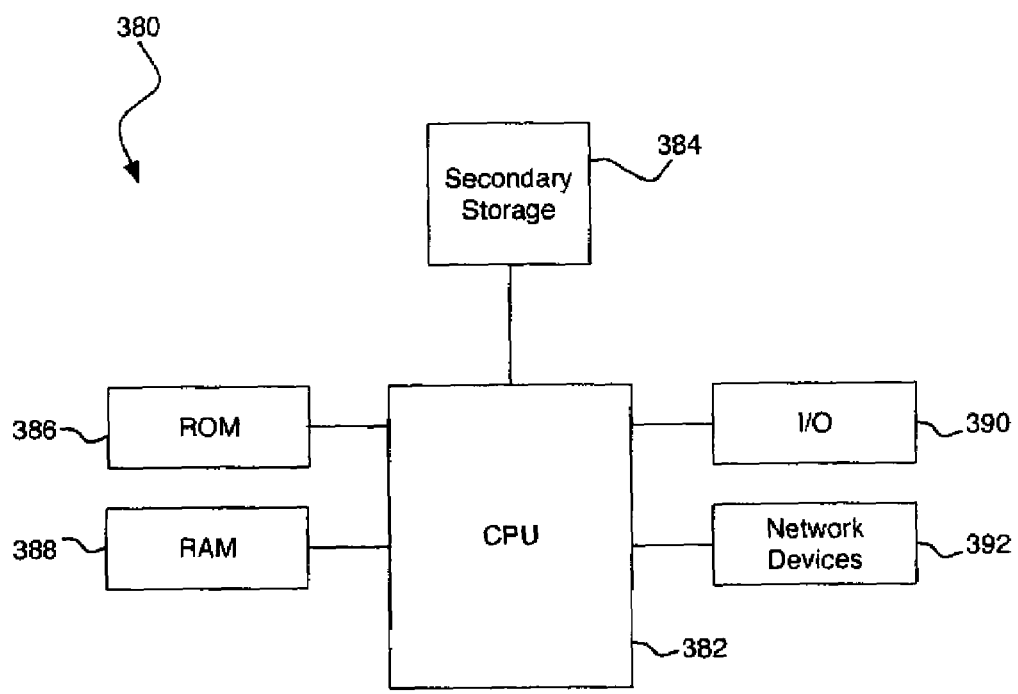
FIG. 4 is a block diagram of an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or Global System for Mobile Communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of building a computer system, comprising:
   determining an average memory storage per virtual machine $M_{avg}$ for a known number of virtual machines;
   determining a nominal number of virtual machines per host computer $VM_{nom}$ for a plurality of host computers to be assembled for the system;
   determining an amount of memory storage per memory pool $MP_{max}$ for one or more memory pools, wherein the one or more memory pools comprise at least part of one or more mass storage units;
   determining a maximum number of host computers that can share each of the one or more memory pools based on the average memory storage per virtual machine for the known number of virtual machines, the nominal number of virtual machines per host computer for the plurality of host computers, and the amount of memory storage per memory pool;
   determining a minimum number of host computers per memory pool needed to absorb a processing load of a failed host computer based on a normal processing load of each host computer $L_n$, and a maximum sustainable processing load of the host computer $L_m$ and;
   assembling the one or more memory pools with the amount of storage per memory pool and assembling the plurality of host computers to include a number of host computers H within or including the maximum number of host computers and the minimum number of host computers for each of the one or more memory pools to handle the known number of virtual machines;
   wherein determining the maximum number of host computers for the at least one memory pool and the minimum number of host computers for the at least one memory pool is determined by $$\frac{MP_{max}}{M_{avg} \times VM_{nom}} \geq H \geq \frac{L_n}{L_m - L_n} + 1.$$

2. The method of claim 1, wherein at least one of the plurality of host computers employs eight central processing units.

3. The method of claim 1, wherein the determining the amount of memory storage per memory pool is based at least in part on a logical unit number size of less than two hundred gigabytes.

4. The method of claim 1, wherein determining the amount of memory storage per memory pool is based at least in part on using a maximum of one hundred and twenty-eight logical unit numbers per memory pool.

5. The method of claim 1, wherein determining the amount of memory storage per memory pool is determined as seven-tenths to eight-tenths times one hundred and twenty-eight times one hundred gigabytes, where one hundred and twenty-eight is the number of logical unit numbers in the one or more memory pools and one hundred gigabytes is about the optimal amount of memory in one logical unit number.

6. The method of claim 1, wherein the nominal number of virtual machines per host computer is forty.

7. The method of claim 1, wherein the nominal number of virtual machines per host computer is a maximum number of virtual machines per host computer.

8. A method of porting servers to a virtual machine pool, including:
   determining an average amount of memory consumed per server $M_{avg}$ for the servers being ported to the virtual machine pool, including an operating system memory allocation and an application memory allocation;
   determining a host computer central processing unit count;
   determining a nominal number of virtual machines per host computer $VM_{nom}$ based at least in part on the host computer central processing unit count and a number of virtual machines which are able to share a central processing unit;
   determining an amount of memory storage per memory pool $MP_{max}$ based on the ability of the virtual machines to address all of the memory storage of the memory pool, wherein the memory pool comprises at least part of one or more mass storage units;
   determining a maximum number of host computers per memory pool based on the amount of memory storage per memory pool, the nominal number of virtual machines per host computer, and the average amount of memory consumed per server;
   determining a minimum number of host computers per memory pool needed to absorb a processing load of a failed host computer based on a normal processing load of each host computer $L_n$, and a maximum sustainable processing load of the host computer $L_m$.
   determining a total number of host computers based on a specified number of virtual machines in the virtual machine pool needed to support the servers and the nominal number of virtual machines per host computer;
   determining a total number of memory pools based on the total number of host computers and having a number of host computers H per memory pool for each of the total number of memory pools, where the number of host computers H per memory pool is less than or equal to the maximum number of host computers and greater than or equal to the minimum number of host computers, wherein determining the maximum number of host computers per memory pool and the minimum number of host computers per memory pool is determined by $$\frac{MP_{\max}}{M_{avg} \times VM_{nom}} \geq H \geq \frac{L_n}{L_m - L_n} + 1;$$

and porting the servers to the specified number of virtual machines executed on the total number of host computers organized around the total number of memory pools.

9. The method of claim 8, wherein the determining the amount of memory storage per memory pool is based at least in part on a maximum number of logical unit numbers that can be addressed by one virtual machine.

10. The method of claim 8, wherein the determining the nominal number of virtual machines per host computer is further based on one or more factors selected from the group comprising of a number of virtual machines running in one central processing unit, a number of virtual machines running in two central processing units, a number of virtual machines running in four central processing units, and a number of virtual machines running in eight central processing units.

11. The method of claim 8, wherein the determining the nominal number of virtual machines per host computer is further based-on the numbers of central processing units that the virtual machines run on.

12. The method of claim 8, further including connecting host computers to the memory pools associated with the host computers.

13. The method of claim 8, wherein the determining the amount of memory storage per memory pool is based at least in part on a size of a logical unit number above which the performance of the logical unit number begins to drop off.

14. A computer system, comprising:
one or more memory pools, wherein the one or more memory pools comprises at least part of one or more mass storage units, and wherein each of the one or more memory pools has an amount of memory storage $MP_{max}$ based on the ability of a plurality of virtual servers to address the memory storage of the memory pool; and a plurality of host computers H organized around each of the one or more memory pools, the number of the plurality of host computers H assembled to support a known number of virtual machines organized around the one or more memory pools determined to be less than or equal to a maximum number of host computers that can share the memory storage of the memory pool based at least in part on a determination of an average amount of memory consumed per virtual machine $M_{avg}$, a determination of nominal number of virtual machines per host computer $VM_{nom}$, and the amount of memory storage per the memory pool $MP_{max}$, and the number of the plurality of host computers H determined to be greater than or equal to a minimum number of host computers needed to absorb a processing load of a failed host computer based on a normal processing load of each host computer $L_n$, and a maximum sustainable processing load of the host computer $L_m$, wherein the maximum number of host computers and the minimum number of host computers is determined by $$\frac{MP_{\max}}{M_{avg} \times VM_{nom}} \geq H \geq \frac{L_n}{L_m - L_n} + 1.$$

15. The computer system of claim 14, wherein the memory pool comprises one hundred and twenty-eight or fewer logical unit numbers.

16. The computer system of claim 15, wherein the logical unit numbers comprise less than two hundred gigabytes of memory.

17. The computer system of claim 15, wherein the logical unit numbers comprise the amount of memory at which the efficiency of the logical unit number efficiency begins to drop off with greater memory size.

18. The computer system of claim 14, wherein each of the plurality of host computers run one or more of the plurality of virtual machines in one or more central processing units and the plurality of virtual machines are relocatable among the plurality of host computers organized around the same memory pool.

* * * * *